United States Patent [19]
Givens

[11] 3,845,299
[45] Oct. 29, 1974

[54] METHOD FOR URANIUM EXPLORATION EMPLOYING RADIOACTIVE RECONNAISSANCE AND ASSAY LOGGING

[75] Inventor: Wyatt W. Givens, Dallas, Tex.

[73] Assignee: Mobil Oil Corporation, New York, N.Y.

[22] Filed: Apr. 13, 1973

[21] Appl. No.: 350,868

Related U.S. Application Data

[63] Continuation-in-part of Ser. No. 310,612, Nov. 29, 1972.

[52] U.S. Cl. ................. 250/256, 250/264, 250/266
[51] Int. Cl. ............................................. G01t 1/30
[58] Field of Search ........... 250/262, 264, 392, 256, 250/266

[56] References Cited
UNITED STATES PATENTS
3,686,503   8/1972   Givens .............................. 250/262

Primary Examiner—Archie R. Borchelt
Assistant Examiner—Harold A. Dixon
Attorney, Agent, or Firm—Andrew L. Gaboriault; William D. Jackson

[57] ABSTRACT

Uranium exploration employing delayed fission neutrons from uranium in borehole logging operations to obtain both a reconnaissance log to identify possible uranium ore bearing zones and an assay log of such zones in order to obtain a qualitative indication of uranium content. In obtaining a DFN log a neutron source is operated in the borehole in order to irradiate adjacent earth material with repetitive bursts of fast neutrons which are spaced by time intervals greater than the time required for dissipation of neutrons originating in the burst. A detector is operated in order to detect delayed neutrons resulting from neutron fission of uranium. The reconnaissance and assay logging operations may be carried out in conjunction with natural gamma ray logs and also in conjunction with a logging operation to obtain the response of the earth material to moderation and absorption of neutrons. Also disclosed is a delayed fission neutron logging system which may be employed in both reconnaissance and assay logging.

6 Claims, 3 Drawing Figures

METHOD FOR URANIUM EXPLORATION EMPLOYING RADIOACTIVE RECONNAISSANCE AND ASSAY LOGGING

CROSS REFERENCE TO RELATED APPLICATION

This application is a continuation-in-part of application Ser. No. 310,612, filed Nov. 29, 1972.

BACKGROUND OF THE INVENTION

This invention relates to uranium exploration and more particularly to a method for prospecting for uranium ore in which delayed fission neutrons from uranium are employed for both reconnaissance and assay logging.

As described in U.S. Pat. No. 3,686,503 to Givens et al., natural earth formations may be characterized with regard to their uranium content on the basis of delayed neutrons resulting from neutron fission of uranium. When a formation containing a uranium ore is irradiated with neutrons, the uranium nuclei react to neutron bombardment by breaking into smaller nuclear fractions which normally are referred to as fission products. The fission of uranium is attended by the emission of prompt neutrons immediately upon occurrence of the fission reaction and also by the emission of delayed neutrons subsequent to the fission process. The delayed neutrons are emitted by the fission products for an appreciable length of time following the fission reaction. The half lives of the six prominent groups of delayed fission neutrons resulting from fission of uranium by thermal neutrons or by fast neutrons vary from about 0.23 to 55.72 seconds with the most abundant delayed neutron group exhibiting a half life of about 2.30 seconds. The aforementioned patent to Givens et al. discloses a subsurface assaying operation which is carried out by locating in a borehole adjacent a rock zone of interest a logging tool which includes a source of fast neutrons and a thermal neutron detector. The formation is irradiated with repetitive bursts of fast neutrons and subsequent to each burst and after dissipation of the original source neutrons delayed neutrons resulting from neutron fission of uranium are detected. The output from the detector is then recorded in order to obtain a log indicative of the uranium content of the formation. In addition, a second detector in the logging tool is employed to detect radiation which is indicative of the intensity of the neutron source.

As disclosed in the aforementioned patent to Givens et al., the rock zones of interest for which delayed fission neutron (DFN) logs are obtained may be identified from a preliminarily run natural gamma ray log. The natural gamma rays associated with uranium mineralization in subterranean rock are emitted predominantly by daughter elements of uranium such as bismuth 214. While it has been recognized that conditions of disequilibrium, such as caused by leaching, between the parent uranium and its daughter elements render natural gamma radiation unreliable as a quantitative indicator of uranium, and hence unsuitable for use in uranium assay logging, natural gamma ray logging has been generally accepted as a qualitative uranium indicator. Thus it has been the practice to first run a gamma ray log in the exploration borehole for reconnaissance purposes and then, based upon indications by the gamma ray log of possible uranium bearing zones, to run a DFN assay log opposite these zones.

As explained in the aforementioned application Ser. No. 310,612, a response logging operation may also be carried out in order to obtain an indication of the response of the rock zones under investigation to moderation and absorption of neutrons. The response log thus obtained may be correlated with the DFN assay log in order to obtain a corrected indication of uranium content.

SUMMARY OF THE INVENTION

In accordance with the present invention, there is provided a new and improved uranium prospecting procedure in which two DFN logs are run in an exploration borehole. The first DFN log is run for reconnaissance purposes and may be carried out after, or in lieu of, a preliminarily run gamma ray log. Thereafter a second DFN log is run for assay purposes in order to obtain a quantitative indication of uranium content. The reconnaissance log is carried out by traversing a subterranean rock penetrated by an exploration borehole with a logging tool containing a neutron source and a radiation detector. The neutron source is operated to irradiate rock material adjacent the borehole at a plurality of locations along the borehole with repetitive bursts of fast neutrons which are spaced by time intervals greater than the time required for dissipation of neutrons originating in the bursts. During intervals between the fast neutron burst and after dissipation of the original source neutrons, the detector is operated in order to detect radiation attendant to delayed neutrons resulting from the neutron fission of uranium. The irradiation thus detected is recorded in correlation with depth to obtain a reconnaissance log whereby zones of uranium ore content may be identified. Thereafter, a DFN assay log is obtained by irradiating a suspected uranium ore bearing zone with repetitive bursts of fast neutrons. As in the case of the reconnaissance log, the fast neutron bursts are spaced by time intervals greater than the time required for dissipation of neutrons originating in the bursts and a detector is operated after dissipation of original source neutrons to detect radiation attendant to delayed neutrons resulting from neutron fission of uranium. For assay purposes, the irradiation of the zone under investigation is continued for a relatively long time period in comparison with the period of irradiation of the zone during the reconnaissance logging procedure. The radiation detected during the assay logging procedure is recorded in order to obtain an assay log which is quantitatively representative of the uranium content of the zone.

In a preferred embodiment of the invention, the reconnaissance log is obtained by moving the logging tool through the borehole at a speed such that the number of fast neutron bursts per foot of borehole traversed is within the range of 12 to 60. In addition, it is preferred in carrying out both the reconnaissance log and the assay log that the radiation detected comprise thermal neutrons.

In accordance with another embodiment of the invention, the DFN reconnaissance and assay logging operations are carried out in conjunction with a response log of the type described in the aforementioned application Ser. No. 310,612. In conducting the response logging operation the rock section under investigation is irradiated with fast neutrons whereby the neutrons are moderated within the rock adjacent the borehole to lower energy levels and undergo absorption within the rock. A detector is operated in order to detect secondary radiation attendant to the lower energy neutrons as these neutrons are influenced by moderation and absorption of the source neutrons. The output from this detector is applied to a recording system in order to obtain a log representative of the response of the formation to moderation and absorption of neutrons within the formation. The results of the response log may be examined in order to estimate the rate at which the DFN reconnaissance log should be carried out. In addition, the response log may be correlated with the later-obtained DFN assay log in order to arrive at a corrected value of uranium content of potential uranium bearing zones.

In a further aspect of the invention, there is provided a new and improved borehole logging system which may be employed to carry out both the reconnaissance logging and assay logging. The system includes a borehole logging tool which comprises a source of fast neutrons and first and second radiation detection units. The first detection unit is adapted for the detection of radiation resulting from delayed neutrons produced from the neutron fission of uranium and the second detection unit is adapted for the detection of radiation representative of the intensity of the neutron source. The system further comprises means for actuating the source to produce repetitive bursts of fast neutrons at the time intervals described above and first and second measuring channels for measuring respectively the outputs from the detector units in the tool. The system further comprises means for producing readouts from the two measuring channels for a relatively small number of neutron bursts when the system is operated in a reconnaissance mode and for a relatively large number of neutron bursts when the system is operated in an assay mode.

DESCRIPTION OF SPECIFIC EMBODIMENTS

The two procedures fundamental to the practice of the present invention are DFN reconnaissance logging in order to identify uranium bearing rock zones and DFN assay logging of these zones in order to obtain a qualitative indication of uranium content. DFN assay logging will be described here only briefly. For a more detailed description of DFN assay logging, reference is made to the aforementioned U.S. Pat. No. 3,686,503 to Givens et al.

Figure 1:
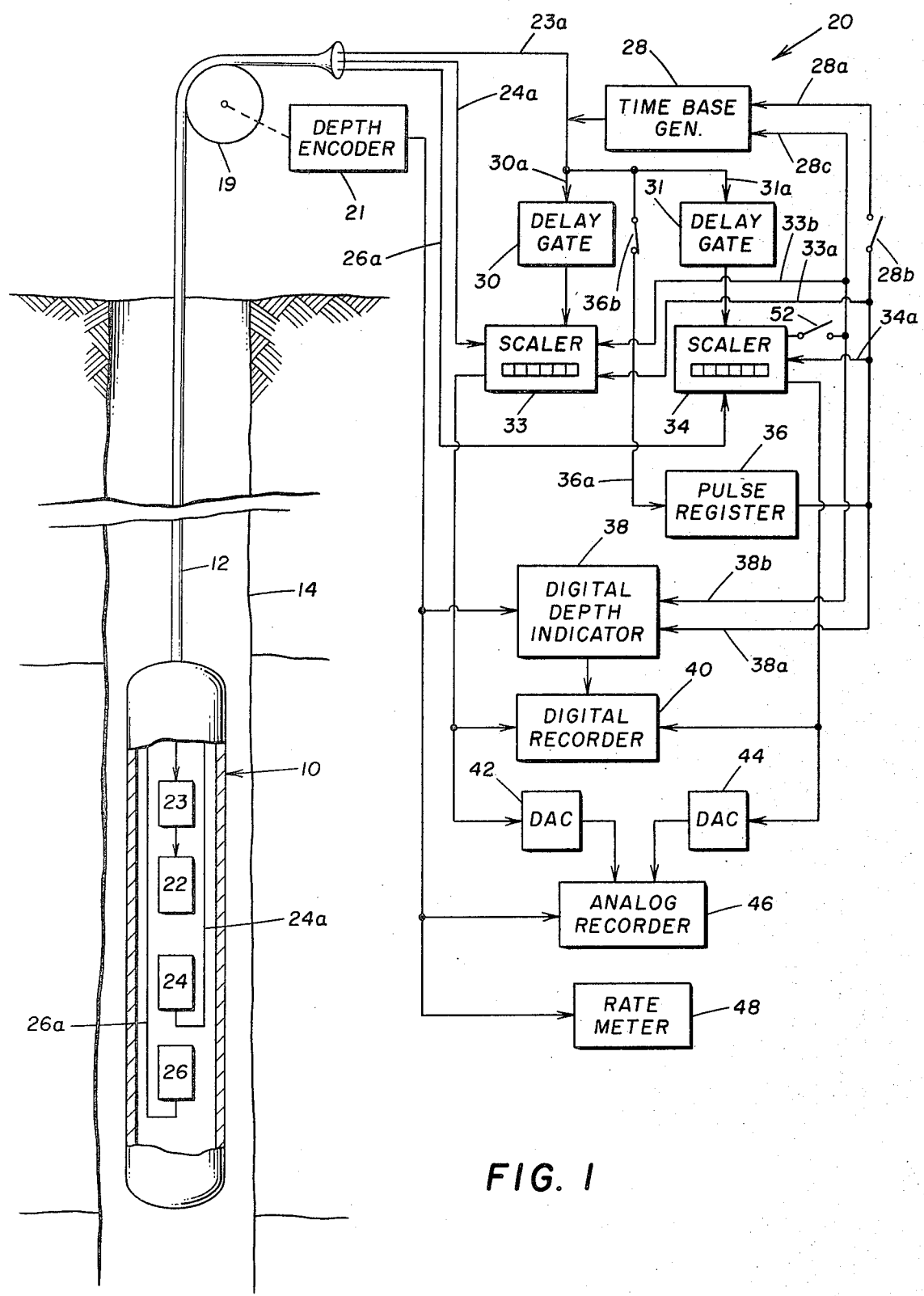
FIG. 1 is a schematic illustration, partly in section, of a logging system of a preferred embodiment of the invention useful for both reconnaissance and assay logging.

Turning now to FIG. 1 there is illustrated a logging tool 10 which is suspended from a cable 12 within a borehole 14. Signals from the logging tool 10 are transmitted uphole via conductors in cable 12 to an uphole analysis and recording circuit 20 at the surface. Circuit 20 operates on the downhole measurements and records them as explained hereinafter. The cable 12 is wound on a motor-driven drum 19 and the several conductors in cable 12 are connected via slip ring and brush connections (not shown) to circuit 20. A depth indicating means 21 produces a depth signal which is recorded in order that the downhole measurements may be correlated with the depth at which they are taken. Depth indicator 21 may take the form of an optical encoder of the type available from Dynamic Research Corp., as Model No. DRC-29-11-B03-300. This device operates as a pulse generator to produce a given number of pulses for each unit length of depth traversed by the logging tool.

The logging tool 10 comprises a pulsed neutron source 22 for irradiation of rock adjacent the borehole with bursts of fast neutrons, a control unit 23 for the source, and a radiation detector 24 for the detection of secondary radiation attendant to delayed neutrons resulting from neutron fission of uranium. The source 22 may be an accelerator-type deuterium-tritium source of fast neutrons. In theory the radiation detector 24 may be either a neutron detector or a gamma ray detector (responsive to gamma rays attendant to the capture of thermal neutrons). However, the use of a gamma ray detector would require that complex energy level discrimination be carried out in order to discriminate the capture gamma rays from gamma rays resulting from the natural radioactivity of any uranium present and gamma rays resulting from the activation of oxygen-16 as described hereinafter. Thus it is preferred that the radiation detector 24 take the form of a thermal neutron detector. For example, detector 24 may comprise one or more helium-3 proportional counters of the type described in U.S. Pat. No. 3,102,198 to Bonner. These helium-3 counters are responsive primarily to thermal neutrons and become increasingly nonresponsive to neutrons of progressively higher energy levels. For example, employing the detection efficiency of such counters for thermal neutrons as a standard (100 percent), the relative efficiencies for 1 ev. neutrons, 10 ev. neutrons, and 100 ev. neutrons are 16 percent, 5 percent, and 1.6 percent, respectively. The source 22 is operated cyclically to produce time-spaced bursts of fast neutrons, with the time intervals between the fast neutron bursts being greater than the time required for the dissipation within the formation of the source neutrons. During the time intervals between the bursts and after dissipation of the source neutrons, the detector 24 is operated in conjunction with suitable gating circuitry as described hereinafter to detect thermalized neutrons resulting from delayed neutron fission of uranium. The output from detector 24 is transmitted to the surface circuit by means of a conductor 24a which extends through cable 12. The gating circuitry may be employed to render detector 24 operative or responsive to the secondary radiation only during the desired measuring intervals. Usually, however, the detector 24 will be continuously responsive to the secondary radiation and the gating circuitry will be employed to gate the detector output to the appropriate measuring means during the desired measurement intervals.

The logging tool 10 also comprises a second radiation detector 26 which, as described in the aforementioned U.S. Pat. No. 3,686,503 and also in U.S. Pat. No. 3,688,117 to Wyatt W. Givens, is employed to indirectly monitor the neutron intensity of source 22. The output from detector 26 is transmitted to the surface via conductor 26a. Detector 26, which may take the form of a conventional gamma ray counter, is used to detect delayed gamma rays which are emitted from oxygen within the formation upon irradiation with fast neutrons from source 22. The reaction by which these gamma rays are emitted is $$O^{16}(n,p)N^{16} \rightarrow \beta^- O^{16} + \gamma. \tag{1}$$

Nitrogen-16 decays by beta emission in accordance with the above reaction with a half life of 7.14 seconds. For any given amount of oxygen nuclei, the number of gamma rays emitted, which are predominantly at energies of 6.14 Mev., 6.92 Mev., and 7.12 Mev., is proportional to the quantity of fast neutrons emitted from source 22. Since the oxygen concentration of most subterranean formations is relatively constant, the count rate of delayed gamma rays resulting from reaction (1) above provides a measure of the intensity of neutron output from source 22.

Turning now to a description of the uphole portion of the DFN assay system, the circuitry 20 comprises a time base generator 28, delay gate generators 30 and 31, gated scalers 33 and 34, and a variable preset pulse register 36. Time base generator 28 is employed to generate a train of triggering pulses for operation of control unit 23 for the downhole neutron source 22 and the delay gate generators 30 and 31. Control unit 23 responds to a pulse from the time base generator to cause source 22 to emit a burst of fast neutrons. Scalers 33 and 34 are accumulating counters which store the applied radiation counts until they read out, at which time they are reset to zero. The delay gate generators respond to a pulse from time base generator 28 to enable scalers 33 and 34 to count the outputs from detectors 24 and 26, respectively, during the desired time intervals after the fast neutron burst. The uphole circuitry also includes a digital depth indicator 38 which receives the output from depth encoder 21 and applies it in digital format to a digital recorder 40. Indicator 38 may be a reversing accumulator available from Systems Development Incorporated, Dallas, Texas, as Model No. SDI 5243, and recorder 40 may take the form of a digital column printer available from Esterline-Angus, Inc., as Model No. P–500. The outputs from scalers 33 and 34 are applied to recorder 40 and also to digital-to-analog converters 42 and 44 where they are converted to analog format and applied to an analog recorder 46 along with the depth signal from indicator 21. The output from indicator 21 also is applied to a ratemeter 48 which indicates the speed at which the logging tool is moved through the borehole.

Departing temporarily from the description of the system shown in FIG. 1, the present invention may be carried out in conjunction with a preliminarily run natural gamma ray log, or the running of a gamma ray log may be dispensed with, and the DFN reconnaissance log relied upon as the sole qualitative uranium indicator. Usually, however, it will be preferred to first run a natural gamma ray log and, if suitable anomalies are present in the gamma ray log, to then run the DFN reconnaissance log. This sequence of operations is advantageous in several respects. Where the uranium parent and its daughter elements become separated through leaching, the zone containing the daughters may exhibit a high natural gamma ray emission even though no uranium is present. By running the DFN reconnaissance log, this zone may be eliminated from further consideration without the need of carrying out a fixed point assay. Conversely, if sufficient time has not elapsed since the leaching process for equilibrium to be re-established, the uranium zone may not be indicated by an anomaly on the gamma ray log, but can be identified by the DFN reconnaissance log. Thus, where the initially run gamma ray log shows one or more zones of high gamma activity, it will be desired to run the DFN reconnaissance log not only through these zones but also for some significant distances above and below the zones. Normally it will be preferred to run the reconnaissance log throughout the section of rock penetrated by the borehole. In those instances where the gamma ray log fails to reveal any anomalies, the exploration borehole usually will be closed without further logging operations.

If a gamma ray log is run, it usually will be preferred to run on the same cable a response log as disclosed in the aforementioned application Ser. No. 310,612. As explained in that application, the response log is later correlated with the DFN assay log in order to arrive at a corrected value of uranium content. In addition, as described hereinafter, the results of the response log can be used to determine desired operating parameters for the DFN reconnaissance log.

Figure 2:
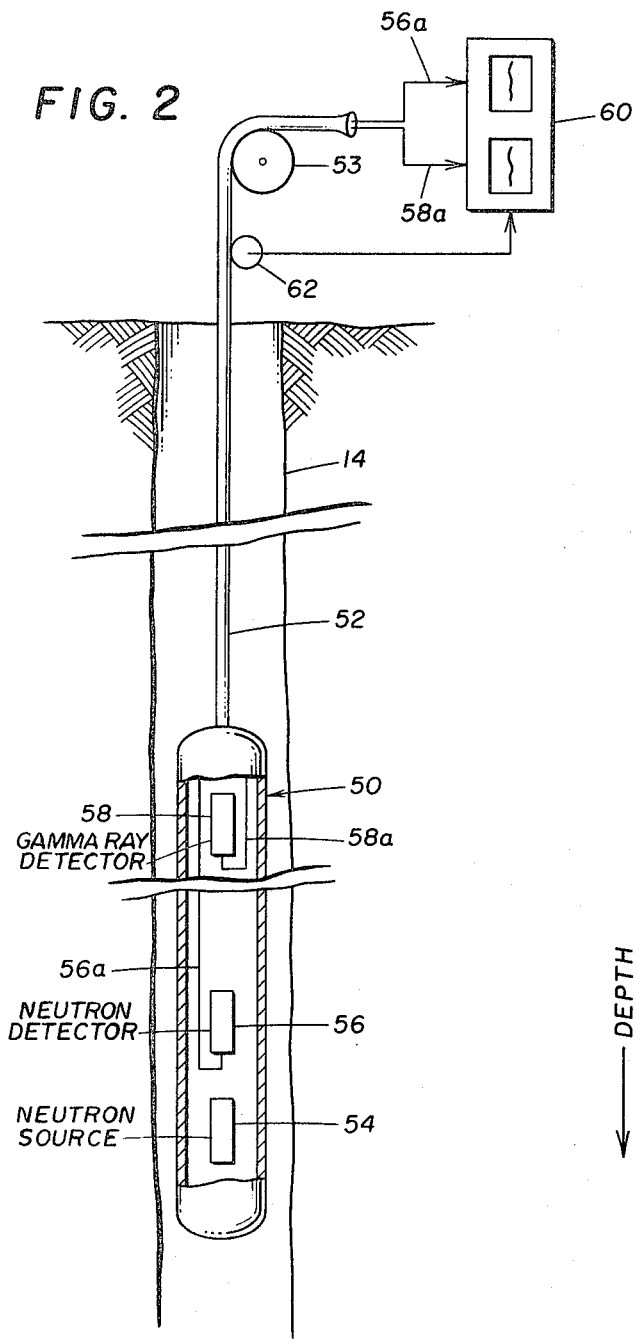
FIG. 2 is an illustration, partly in section, of a logging system which may be employed to obtain a preliminarily run gamma ray log and a response log.

An arrangement for obtaining a natural gamma ray log and a response log is illustrated in FIG. 2. This system comprises a detector of natural gamma radiation, a source for irradiating adjacent rock material with fast neutrons, and a detector for detecting secondary radiation attendant to the low energy neutrons resulting from the fast neutron irradiation. More particularly, there is shown in FIG. 2 a logging tool 50 which is suspended in the borehole 14 by means of a cable 52 supported on a motor-driven drum 53. The logging tool comprises a fast neutron source 54, a first radiation detector 56 located in close proximity to source 54, and a second remotely located detector 58 for the detection of gamma rays. Detector 58 preferably will be spaced from source 54 by a distance of eight feet or more in order to ensure that it is responsive only to natural gamma radiation. Detector 56, which preferably is a thermal neutron detector, is spaced a relatively short distance, e.g., on the order of 15 to 20 inches, from source 54. The signal outputs from the detectors 56 and 58 are transmitted uphole by means of conductors 56a and 58a in cable 52 and through slip ring and brush connections (not shown) to a recording system 60 which separately records the count rates of the detectors. As the logging tool is moved through the well, a depth indicating means such as a measuring sheave 62 produces a depth signal which is applied also to recorder 60 thus correlating the downhole measurements with the depths at which they are taken.

In carrying out the reconnaissance log, the logging tool 10 (FIG. 1) is lowered to a desired location in the well, normally at the bottom of the rock section to be explored. The rock section under investigation is traversed with the logging tool while operating the source 22 at the desired rate to irradiate the adjacent rock material at a plurality of locations along the borehole with bursts of fast neutrons. The pulse repetition rate of source 22 is controlled by the pulse output signal from time base generator 28 which is applied via conductor 23a to the control unit 23. For example, the source may be operated so that it is pulsed to give two fast neutron bursts per second with each burst having a duration of about 3 microseconds. Other suitable parameters can be employed. Thus the pulse duration may range up to several hundred microseconds and likewise the pulse repetition rate may range up to several tens of bursts per second. The output signal from the time base generator also is applied via conductors 30a and 31a to delay gate generators 30 and 31, respectively. Delay gate generator 30 operates in response to each pulse from generator 28 to enable scaler 33 to begin counting at some desired time interval after the fast neutron burst from source 22. For example, the scaler 33 may begin counting at about 2 to 5 milliseconds after each neutron burst and to continue counting until the start of the next neutron burst. The output from the detector 24 is applied through suitable amplification and pulse height discrimination stages (not shown) to the gated scaler 33. The output from detector 26 is likewise transmitted to the surface and applied through suitable amplification and pulse height discrimination stages (not shown) to gated scaler 34. Thus scaler 34 records a gamma ray count which is proportional to the number of neutrons produced by the downhole source 22. Scaler 34 normally will be enabled for counting by delay gate generator 31 for the same period between neutron bursts as scaler 33.

The output from time base generator 28 also is applied via channel 36a, including closed switch 36b, to preset pulse register 36. This register is set to generate a control pulse after receiving a desired number of timing pulses from generator 28. Assuming that the logging tool is operated to traverse the rock section continuously, rather than incrementally, the number set into register 36 is determined by the pulse rate from generator 28, the speed at which the logging tool is moved through the borehole, and the interval unit over which the measurements are averaged. For example, assuming that it is desired to obtain readouts from scalers 33 and 34 for each one-foot section of borehole traversed and that the tool is moved at a logging speed of 6 feet per minute with a source output of two neutron bursts per second, a count of twenty would be set into the pulse register.

When the pulses accumulated from time base generator 28 reach the number set into pulse register 36, the register generates a signal pulse which is applied via channels 33a, 34a, and 38a to scalers 33 and 34 and to digital depth indicator 38, respectively. In response to this signal, the depth of the logging tool 10, as registered by depth indicator 38, and the data accumulated in scalers 33 and 34 are applied to digital recorder 40. For example, where the recorder 40 is a column printer as described previously, the data from units 33, 34, and 38 will be printed on paper tape. Upon completion of the recording of data, pulse register 36 and scalers 33 and 34 are reset to zero. The printing and resetting operations take only a few milliseconds and thus are completed during the delay period as determined by delay gate generators 30 and 31. Switch 28b in channel 28a is in the open position during the reconnaissance logging operation. Thus generator 28 is unaffected by the output of register 36 and the operation of source 22 and scalers 33 and 34 continues.

The data accumulated in scalers 33 and 34 also are applied to digital-to-analog converters 42 and 44, respectively. The outputs from units 42 and 44 are analog voltage signals representative of the applied digital data. These voltage signals are applied to analog recorder 46 where they are recorded in analog format as a function of depth.

The above described arrangement of scalers and digital-to-analog converters is particularly advantageous where, as usually will be the case, relatively low count rates are obtained from detectors 24 and 26. The scaler outputs to the digital recorder enables the detected radiation to be recorded to a reasonably high degree of accuracy and at the same time the analog inputs to recorder 46 enable the operator to visually observe the log as it is obtained. It is to be recognized that in areas where relatively high count rates are encountered, the degree of accuracy afforded by scalers 33 and 34 may be unnecessary. In this case, the scalers and their associated digital-to-analog converters could be eliminated and the outputs from detectors 24 and 26 could be applied to gated count rate meters.

The number of fast neutron bursts per foot of borehole traversed during the reconnaissance logging operation will depend upon such factors as the duration and neutron intensity of the bursts from source 22 and the capacity of the rock zones under investigation for moderation and absorption of neutrons. For a typical source intensity on the order of $5 \times 10^7$ neutrons per burst, in most cases it will be preferred to move the logging tool 10 through the borehole during the reconnaissance logging operation at a speed such that the number of fast neutron bursts from source 22 per linear foot of borehole is within the range of 12 to 60. Where the neutron intensity of the source is relatively high and/or where the rock under investigation exhibits a relatively low capacity for moderation and absorption of neutrons, the tool may be moved through the borehole at a relatively high speed to result in a rate of neutron bursts per foot near the lower end of this range. For a low intensity source and/or a relatively high absorption and moderation response, the logging tool normally would be moved through the borehole at a somewhat lower speed to achieve a greater number of neutron bursts per foot of borehole. From the foregoing it will be recognized that an initially run response log can be employed to advantage in arriving at an estimation of the capacity of the rock section under investigation for moderation and absorption of neutrons. From this, the number of fast neutron bursts per foot desirable for the reconnaissance log can be determined to arrive at the speed at which the DFN reconnaissance log is to be run.

Figure 3:
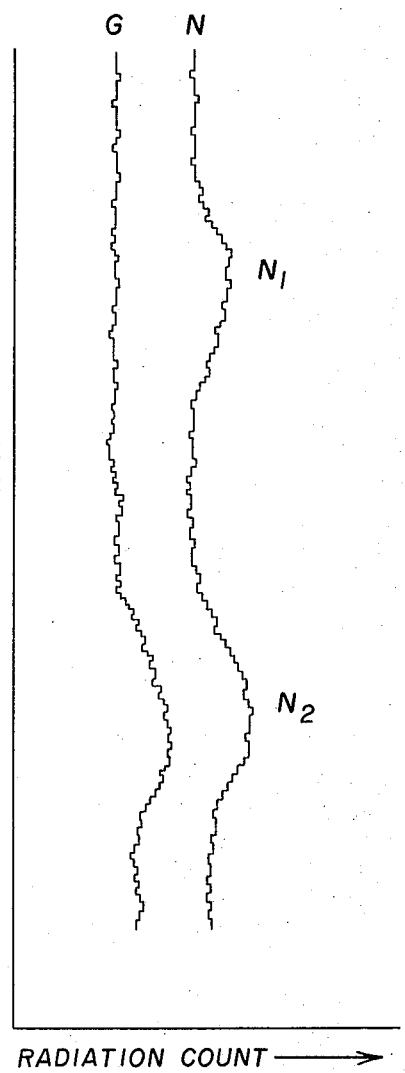
FIG. 3 is an illustration of a reconnaissance log obtained in accordance with the present invention.

After completion of the reconnaissance logging operation, the log thus obtained is examined in order to locate uranium ore bearing zones as indicated by the delayed fission neutral count from scaler 33. In interpreting the reconnaissance log, it is to be recognized that the DFN count from scaler 33 should be interpreted in correlation with the gamma ray count from scaler 34. This may be illustrated by reference to FIG. 3 which shows the results of a reconnaisance log as it might appear in analog format on a strip chart recorder. In FIG. 3 curve G is a plot against depth (in ordinate) of the gamma ray monitor count from scaler 34 and digital-to-analog converter 44 and curve N is a plot against depth of the delayed fission neutron count from scaler 33 and digital-to-analog converter 42. As shown in FIG. 3, curve N exhibits a deflection indicative of an increase in neutron counts at sections $N_1$ and $N_2$. The deflection at section $N_1$ is indicative of a uranium bearing zone.

However, adjacent section $N_2$ it will be noted that the gamma ray curve G shows a corresponding deflection indicating that the higher neutron count at this point likely was due to an increase in intensity of the neutron source rather than the existence of a uranium ore zone.

In carrying out the assay logging operation, the assay period may be determined by the number of neutrons from source 22 as indicated indirectly by scaler 34 or by the number of neutron bursts from source 22 as indicated by pulse register 36. The former mode of operation usually will be preferred. In this case, switch 52 leading to channels 28c, 33b, and 38b is closed and switch 36b is opened. As explained in greater detail in the aforementioned U.S. Pat. No. 3,686,503, the scaler 34 records the gamma ray count (indicative of the number of neutrons from source 22) to a predetermined value and then applies a control signal by way of channels 28c, 33b, and 38b to the time base generator 28, scaler 33, and digital depth indicator 38. In response to this signal, the time base generator is turned off, thus terminating the downhole neutron output from source 22 and counting by both of scalers 33 and 34 to complete an assay period for the zone under investigation. In addition, the data in scalers 33 and 34 and the depth indicator 38 are recorded by recorder 40.

In the alternative mode of operation, the preset pulse register 36 is employed to determine the assay period. In this case, switch 52 is opened and switches 36b and 28b are closed. The number of pulses corresponding to the desired number of neutron bursts for an assay is set into register 36. When the number of pulses from time base generator 28 reaches this number, pulse register 36 generates a signal which is applied by way of channel 28a to turn off the time base generator 28. This again terminates the downhole neutron pulsing operation as well as counting by both of scalers 33 and 34. The output signal from pulse register 36 also is applied to the scalers and to the digital depth indicator 38 to cause the data accumulated by the scalers and the depth to be recorded by recorder 40. In this mode of operation, the pulse register acts as a timer in conjunction with the time base generator. Assuming that the repetition rate from neutron source 22 is two bursts per second as described above, register 36 may be set to generate its control pulse upon accumulation of 360 pulses from generator 28, corresponding to a like number of bursts from source 22, and at the rate of two bursts per second, an assay period of about 3 minutes.

I claim:

1. In a method of prospecting for uranium ore in a section of subterranean rock penetrated by a borehole, the steps comprising:
   a. traversing said rock section with a logging tool located in said well and operating a neutron source therein to irradiate adjacent rock material at a plurality of locations along said borehole with repetitive bursts of fast neutrons spaced by time intervals greater than the time required for dissipation of neutrons originating in said bursts,
   b. during time intervals between said bursts and after the time required for dissipation of neutrons originating in said bursts operating a detector to detect radiation attendant to delayed neutrons resulting from neutron fission of uranium,
   c. recording radiation detected in step (b) in correlation with depth to obtain a reconnaissance log whereby zones of interest suspected of containing uranium ore may be identified,
   d. thereafter irradiating a suspected uranium ore bearing zone with repetitive bursts of fast neutrons spaced by time intervals greater than the time required for dissipation of neutrons originating in said bursts and continuing the irradiation of said zone for a relatively long period of time in comparison to the period of irradiation of said zone in step (a),
   e. during time intervals between said bursts and after the time required for dissipation of neutrons originating in said bursts operating a detector to detect radiation attendant to delayed neutrons resulting from neutron fission of uranium, and
   f. recording radiation detected in step (e) to obtain an assay log quantitatively representative of the uranium content of said zone.

2. The method of claim 1 wherein said reconnaissance logs are obtained by moving the logging tool through the borehole during steps (a) and (b) of claim 1 at a logging speed such that the number of fast neutron bursts per foot of borehole traversed is within the range of 12 to 60 neutron bursts per foot.

3. The method of claim 1 wherein the radiation detected in steps (b) and (e) comprises thermal neutrons.

4. The method of claim 1 further comprising the steps of:
   g. irradiating said rock section with a source of fast neutrons whereby said fast neutrons are moderated in the rock material adjacent said borehole to form a thermal neutron population subject to absorption within said rock material,
   h. detecting thermal neutrons from said thermal neutron population, and
   i. recording the count rate of thermal neutrons detected in step (h) to obtain a log representative of the response of said rock material to moderation and absorption of neutrons.

5. In a method of prospecting for uranium ore in subterranean rock penetrated by a borehole, the steps comprising:
   a. running a gamma ray detector in said borehole to obtain a natural gamma ray log and from said log identifying at least one zone of high gamma activity indicative of possible uranium ore content,
   b. thereafter traversing a rock section which includes said zone of high gamma activity and extends above and below said zone with a logging tool located in said well and operating a neutron source therein to irradiate adjacent rock material at a plurality of locations along said borehole with repetitive bursts of fast neutrons spaced by time intervals greater than the time required for dissipation of neutrons originating in said bursts,
   c. during time intervals between said bursts and after the time required for dissipation of neutrons originating in said bursts operating a detector to detect radiation attendant to delayed neutrons resulting from neutron fission of uranium,
   d. recording radiation detected in step (c) in correlation with depth to obtain a reconnaissance log whereby zones of interest suspected of containing uranium ore may be identified, e. thereafter irradiating a suspected uranium ore bearing zone identified in step (d) with repetitive bursts of fast neutrons spaced by time intervals greater than the time required for dissipation of neutrons originating in said bursts and continuing the irradiation of said zone for a relatively long period of time in comparison to the period of irradiation of said zone in step (b), f. during time intervals between said bursts and after the time required for dissipation of neutrons originating in said bursts operating a detector to detect radiation attendant to delayed neutrons resulting from neutron fission of uranium, and g. recording radiation detected in step (f) to obtain an assay log quantitatively representative of the uranium content of said zone.

6. The method of claim 5 further comprising carrying out, concomitantly with running the natural gamma ray log of step (a), the steps of:

h. irradiating said subterranean rock with a source of fast neutrons whereby said fast neutrons are moderated in the rock material adjacent said borehole to form a thermal neutron population subject to absorption within said rock material, i. detecting thermal neutrons from said thermal neutron population, and j. recording the count rate of thermal neutrons detected in step (i) to obtain a log representative of the response of said rock material to moderation and absorption of neutrons.

* * * * *